United States Patent
Boks et al.

(10) Patent No.: US 10,046,684 B2
(45) Date of Patent: Aug. 14, 2018

(54) DUAL LATCH HIGH PIVOT HEAD RESTRAINT

(71) Applicant: Gill Industries, Inc., Grand Rapids, MI (US)

(72) Inventors: Michael Boks, Grand Rapids, MI (US); John Witte, Ada, MI (US); Robert Sutter, Rockford, MI (US); Brian Leja, Rockford, MI (US)

(73) Assignee: GILL Industries, Inc., Grand Rapids, MI (US)

( * ) Notice: Subject to any disclaimer, the term of this patent is extended or adjusted under 35 U.S.C. 154(b) by 0 days.

(21) Appl. No.: 15/468,856

(22) Filed: Mar. 24, 2017

(65) Prior Publication Data

US 2017/0274803 A1    Sep. 28, 2017

Related U.S. Application Data

(60) Provisional application No. 62/313,310, filed on Mar. 25, 2016.

(51) Int. Cl.
*A47C 7/38* (2006.01)
*B60R 21/055* (2006.01)
*B60N 2/838* (2018.01)
*B60N 2/888* (2018.01)

(52) U.S. Cl.
CPC ............ *B60N 2/838* (2018.02); *B60N 2/888* (2018.02)

(58) Field of Classification Search
CPC ...... B60N 2/838; B60N 2/888; B60N 2/4838; B60N 2/4885

USPC .......................................................... 297/408
See application file for complete search history.

(56) References Cited

U.S. PATENT DOCUMENTS

| 7,717,516 | B2 * | 5/2010 | Sutter, Jr. | B60N 2/856 297/408 X |
|---|---|---|---|---|
| 2005/0093685 | A1 * | 5/2005 | Kachouh | B60N 2/0244 340/438 |
| 2005/0225146 | A1 * | 10/2005 | Sutter, Jr. | B60N 2/876 297/408 |
| 2006/0061187 | A1 * | 3/2006 | Gauthier | A47C 1/10 297/408 |
| 2008/0100118 | A1 * | 5/2008 | Young | B60N 2/888 297/404 |
| 2010/0001561 | A1 * | 1/2010 | Otsuka | B60N 2/42781 297/216.12 |
| 2010/0117432 | A1 * | 5/2010 | Lutzka | B60N 2/859 297/408 |

(Continued)

*Primary Examiner* — Rodney B White
(74) *Attorney, Agent, or Firm* — Dickinson Wright PLLC (57) ABSTRACT

A foldable head restraint apparatus for connecting to a seat of a vehicle. The foldable head restraint apparatus includes a pair of brackets for being connected to a cover. A pivot tube rotatably supports the brackets along a first axis. At least one seat connector is connected to the pivot tube for non-rotatably supporting the pivot tube relative to the seat of the vehicle. A pair of latches are each non-rotatably disposed about the pivot tube adjacent to each of the brackets. A pair of cams are each rotatably connected to one of the brackets and are rotatable between a latched position and an unlatched position. At least one release connector is connected to each of the cams and is moveable for providing the rotating movement of the cams in response to movement of the release connector to provide synchronized rotation of the cams.

22 Claims, 7 Drawing Sheets

(56) References Cited

U.S. PATENT DOCUMENTS

| | | | |
|---|---|---|---|
| 2010/0133889 A1* | 6/2010 | Lutzka | B60N 2/3009 |
| | | | 297/408 |
| 2011/0101762 A1* | 5/2011 | Lutzka | B60N 2/859 |
| | | | 297/408 |
| 2013/0257118 A1* | 10/2013 | Corral Rodriguez | B60N 2/42727 |
| | | | 297/216.12 |
| 2015/0266401 A1* | 9/2015 | Grable | B60N 2/4844 |
| | | | 297/408 |
| 2015/0266402 A1* | 9/2015 | Lutzka | B60N 2/4855 |
| | | | 297/408 X |

* cited by examiner

DUAL LATCH HIGH PIVOT HEAD RESTRAINT

CROSS-REFERENCE TO RELATED APPLICATIONS

The present invention is related to, and claims the benefit of priority from, U.S. Provisional Application Ser. No. 62/313,310, filed Mar. 25, 2016, the disclosure of which application is incorporated herein by reference in its entirety.

FIELD OF THE INVENTION

The invention relates generally to a vehicle head restraint. More particularly, the invention relates to a foldable dual latch high pivot head restraint

BACKGROUND OF THE INVENTION

Head restraints are known in the art for protecting a vehicle occupant from serious injury due to sudden movement of the vehicle. Head restraints generally are connected to and extend upwardly from a vehicle seat.

While head restraints are necessary to ensure the safety of vehicle occupants, at times, head restraints can present difficulties. More particularly, head restraints can obstruct a driver's view when looking rearward. Further, if a seat is folded forward to allow a passenger to enter the rear portion of the vehicle, the head restraint may contact the dashboard in front of the seat or any seat forward in the vehicle of the particular seat being folded, for example, if located in the second or third row, thus stopping the seat from fully folding down.

Improved head restraints have been developed that are rotatable relative to the seat between an upright position and a folded position. In the upright position, the head restraint is generally upright and serves as protection for a vehicle passenger. In the folded position, the head restraint is rotated relative to the vehicle seat to allow complete kinematic movement of the seatback, or to increase rearward visibility.

While such foldable head restraints offer advantages over non-foldable head restraints, there remains room for improvements to foldable head restraints to make them able to sustain higher loads during impact, easier to manufacture, simpler in design, and cheaper.

SUMMARY OF THE INVENTION

According to an aspect of the disclosure, a foldable head restraint apparatus for connecting to a seat of a vehicle is provided. The foldable head restraint apparatus includes a pair of brackets for being connected to a cover. A pivot tube rotatably supports the brackets along a first axis. At least one seat connector is fixedly connected to the pivot tube for non-rotatably supporting the pivot tube relative to the seat of the vehicle. A pair of latches are each non-rotatably disposed about the pivot tube adjacent to each of the brackets. A pair of cams are each rotatably connected to one of the brackets and are rotatable between a latched position and an unlatched position, wherein each of the cams engage one of the latches in the latched position to fix the brackets relative to the pivot tube and wherein the cams are spaced from the latches in the unlatched position to allow the brackets to be rotated about the first axis relative to the pivot tube. At least one release connector is connected to each of the cams and is moveable for providing the rotating movement of the cams in response to movement of the release connector to provide synchronized rotation of the cams. A cable is connected to the release connector for providing the movement of the release connector in response to movement of the cable by an operator. Several embodiments of a release connector are provided in the subject disclosure.

The release connector advantageously keeps both cams synchronized during disengagement from the latches. Said another way, the release connector keeps the cams' timing in sync with one another to avoid one cam movement and disengagement before another cam. This allows one mechanical action of pulling a strap that is connected to the cable to reliably disengage both cams from the latches to fold the head restraint and seat.

According to yet another aspect of the disclosure, a foldable head restraint apparatus is provided that includes a cover that has a front shell and a rear shell. The front and rear shells are connected to one another and define a cavity therebetween. The front shell and the rear shell each present an inner face. An array of ribs extend transversely to the inner face of each of the shells. A pair of brackets are connected to the rear cover in the cavity. At least one spacer pin extends between the brackets and connects the brackets together. A plurality of the ribs of the rear cover each define an indentation for receiving the at least one spacer pin. The indentations each include a pair of side walls that extend perpendicularly to the inner face, and a bottom wall that is perpendicular to the side walls. The bottom wall of each of the indentations defines a V-shaped extrusion for allowing the ribs to be compressed downwardly at the bottom wall during insertion of the at least one spacer pin to secure the at least one spacer pin in place.

The ribs that define the indentations, i.e., "crush ribs", reduce buzz, squeak, and rattle of the head restraint apparatus by allowing a tight fit between the spacer pins and the front and rear covers.

BRIEF DESCRIPTION OF THE DRAWINGS

The present invention will be readily appreciated, as the same becomes better understood by reference to the following detailed description when considered in connection with the accompanying drawings wherein.

DESCRIPTION OF THE EXAMPLE EMBODIMENTS

Referring to the Figures, wherein like numerals indicate corresponding parts throughout the several views, a foldable head restraint apparatus 20 is generally shown for connecting to a seat of a vehicle.

Figure 1:
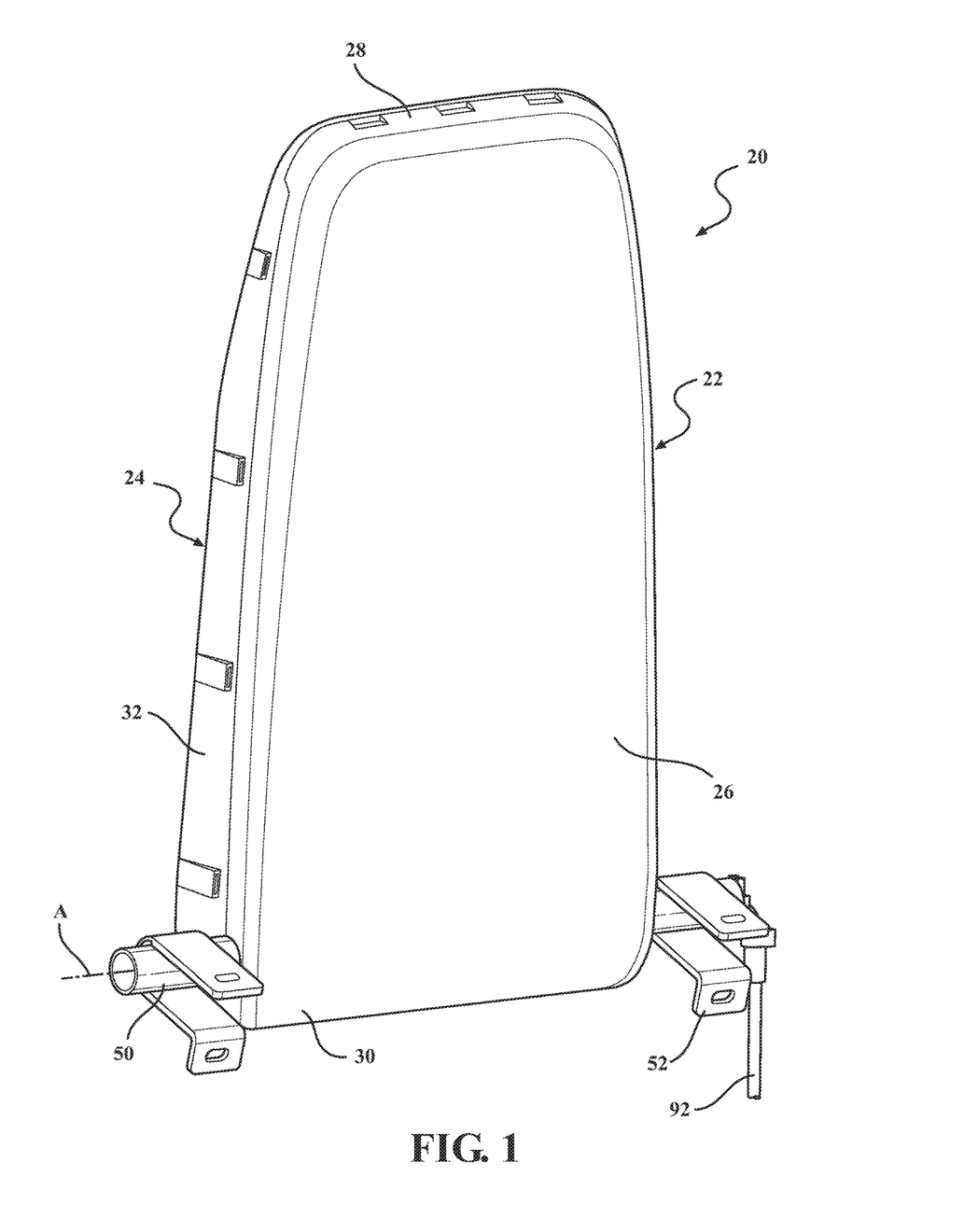
FIG. 1 is a perspective view of an example embodiment of a foldable head restraint apparatus according to an aspect of the disclosure.
Figure 2:
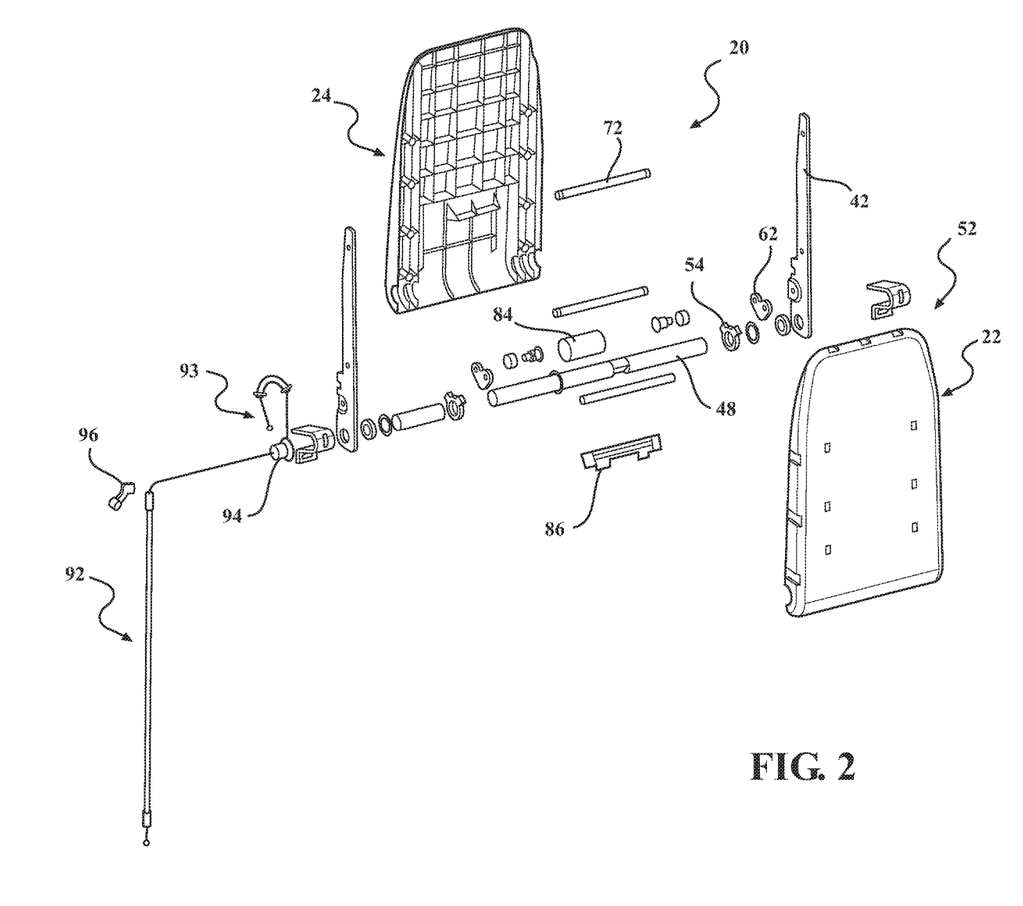
FIG. 2 is an exploded perspective view of the foldable head restraint apparatus of FIG. 1.
Figure 3:
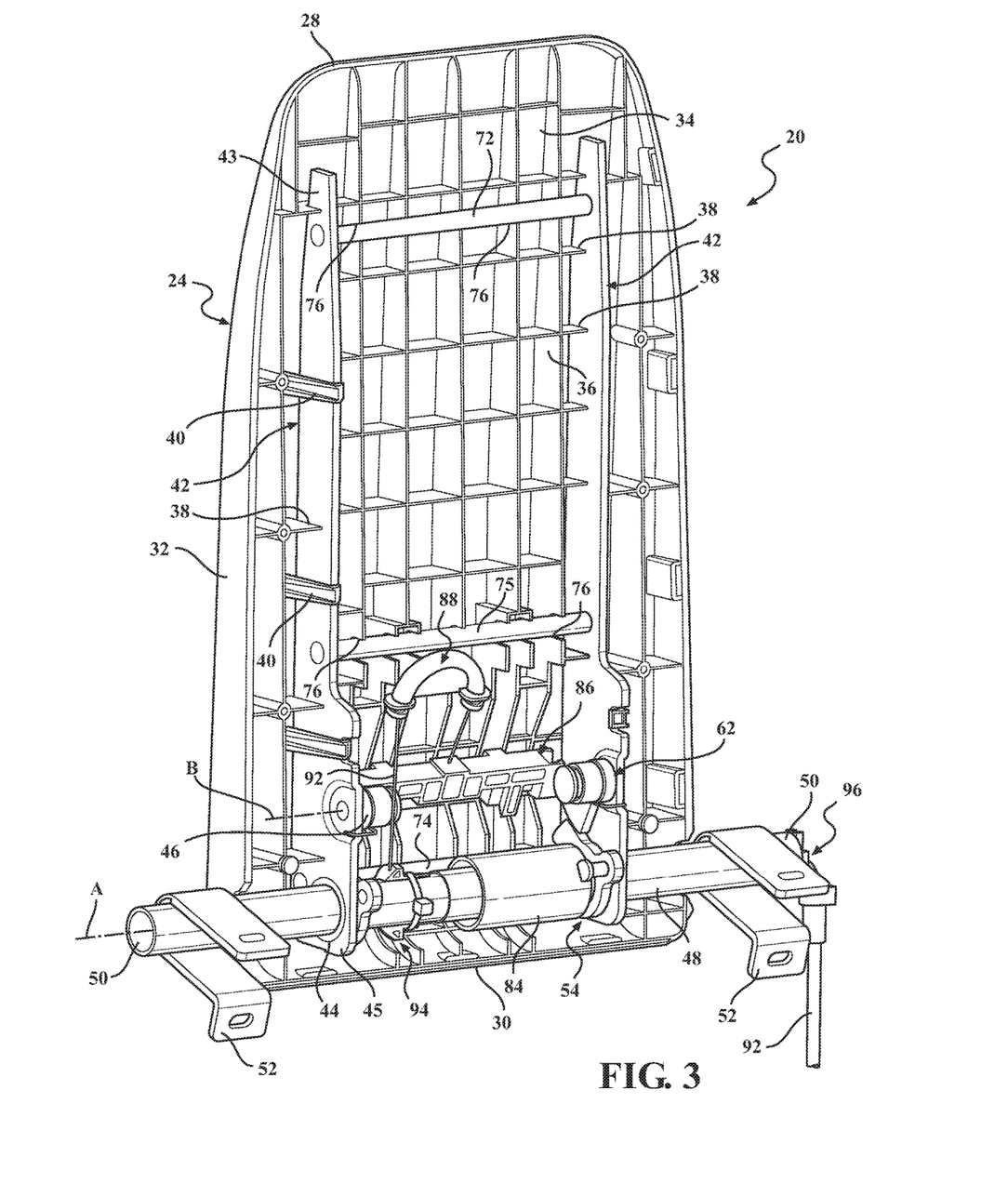
FIG. 3 is a perspective view of the foldable head restraint apparatus of FIG. 1 with the front cover removed to illustrate the components disposed inside the cover.

As best shown in FIGS. 1-3, the foldable head restraint apparatus 20 includes a cover that comprises a front shell 22 and a rear shell 24. The cover may receive a bun that acts as a head cushion for occupants of the vehicle. The front and rear shells 22, 24 each have a generally rectangular-shaped panel 26 that is surrounded by a top 28, bottom 30 and pair of sides 32. The top 28, bottom 30 and sides 32 each extend transversely to the panels 26, and the top 28, bottom 30 and sides 32 of the front and rear shells 22, 24 are connected to one another along a plane and define a cavity therebetween. It should be appreciated that the panels 26 of the front and rear shells 22, 24 could have other shapes.

As best shown in FIG. 3, the panels 26 of the front and rear shells 22, 24 each further present an inner face 34. An array of ribs 36 extend transversely to the inner face 34 of the front and rear shells 22, 24. It should be appreciated that the ribs 36 could have various shapes and thicknesses.

The ribs 36 of the rear shell 24 may define a pair of sets of slots 38 each defined near of the sides 32. The slots 38 of each set of slots 38 aligned linearly with one another adjacent to one of the sides 32. Furthermore, a plurality of securing tabs 40 each extend from one of the ribs 36 adjacent to one of said slots 38. It should be appreciated that the slots 38 can be in the center of the shell 24 or can be angled to sides 32.

A pair of brackets 42 are each received by one of the sets of slots 38 with a plurality of the securing tabs 40 holding the brackets 42 in place. The brackets 42 extend in spaced and parallel relationship with one another, with each bracket 42 extending between a proximal extremity 43 and a distal extremity 45. It should be appreciated that the brackets 42 may be angled or perpendicular in relationship with one another. Each of the brackets 42 further define a pivot hole 44 adjacent to the distal extremity 45 to define a first axis A between the brackets 42. Furthermore, each of the brackets 42 define a cam hole 46 that is spaced from the pivot hole 44 toward the proximal extremity 43 along a second axis B that extends between the brackets 42 in parallel relationship with the first axis A.

A pivot tube 48 is disposed in the pivot holes 44 of the brackets 42 for rotatably supporting the brackets 42 about the pivot tube 48 and the first axis A. The pivot tube 48 extends between a pair of ends 50 and defines a hollow between the ends 50. The ends 50 are disposed outside of the brackets 42 and the cover 22, 24.

A pair of seat connectors 52 are connected to the ends 50 of the pivot tube 48 for non-rotatably supporting the pivot tube 48 relative to the seat of the vehicle for allowing the brackets 42 (and apparatus 20) to pivot about the first axis A relative to the seat. Said another way, the seat connectors 52 anchor the pivot tube 48 to the vehicle seat, thus allowing the cover 22, 24 and apparatus 20 to rotate relative to the seat about the first axis A.

An upper spacer pin 72 extends between and connects the brackets 42 together adjacent to the distal extremity 43 of the brackets 42. Further, a lower spacer pin 74 extends between and connects the brackets 42 together adjacent to the proximal extremity 45 of the bracket 42. Furthermore, a middle spacer pin 75 extends between and connects the brackets between the upper and lower spacer pins 72, 74.

Figure 6:
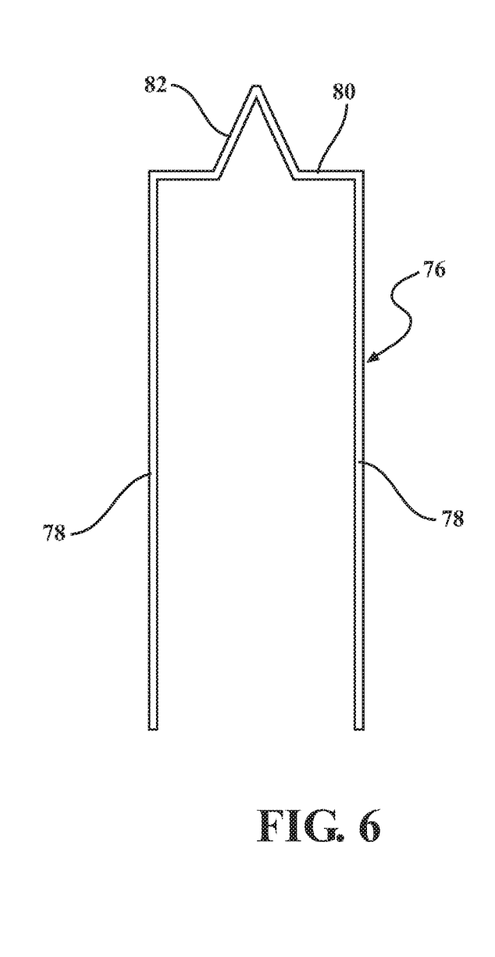
FIG. 6 is a side cross-sectional view of an indentation of a rib for receiving a spacer pin.

A plurality of the ribs 36 of the rear cover 24 define indentations 76 for receiving the upper, lower and middle spacer pins 72, 74, 75. Indentations 76 are defined by one of the ribs 36 and disposed in alignment with one another parallel to the first axis A. As shown in FIG. 6, each of the indentations 76 includes a pair of side walls 78 that extend perpendicularly to the inner face 34 and a bottom wall 80 that extends between the side walls 78. The bottom wall 80 defines a extrusion 82 that has a V-shape for being crushed down by the spacer pins 72, 74, 75 when the front shell 22 is snapped in place. It should be appreciated that the ribs 36 that define the extrusions 82, i.e., crush ribs, reduce buzz, squeak, and rattle by allowing a tight fit between the spacer pins 72, 74, 75 and front and rear shells 22, 24.

Figure 4:
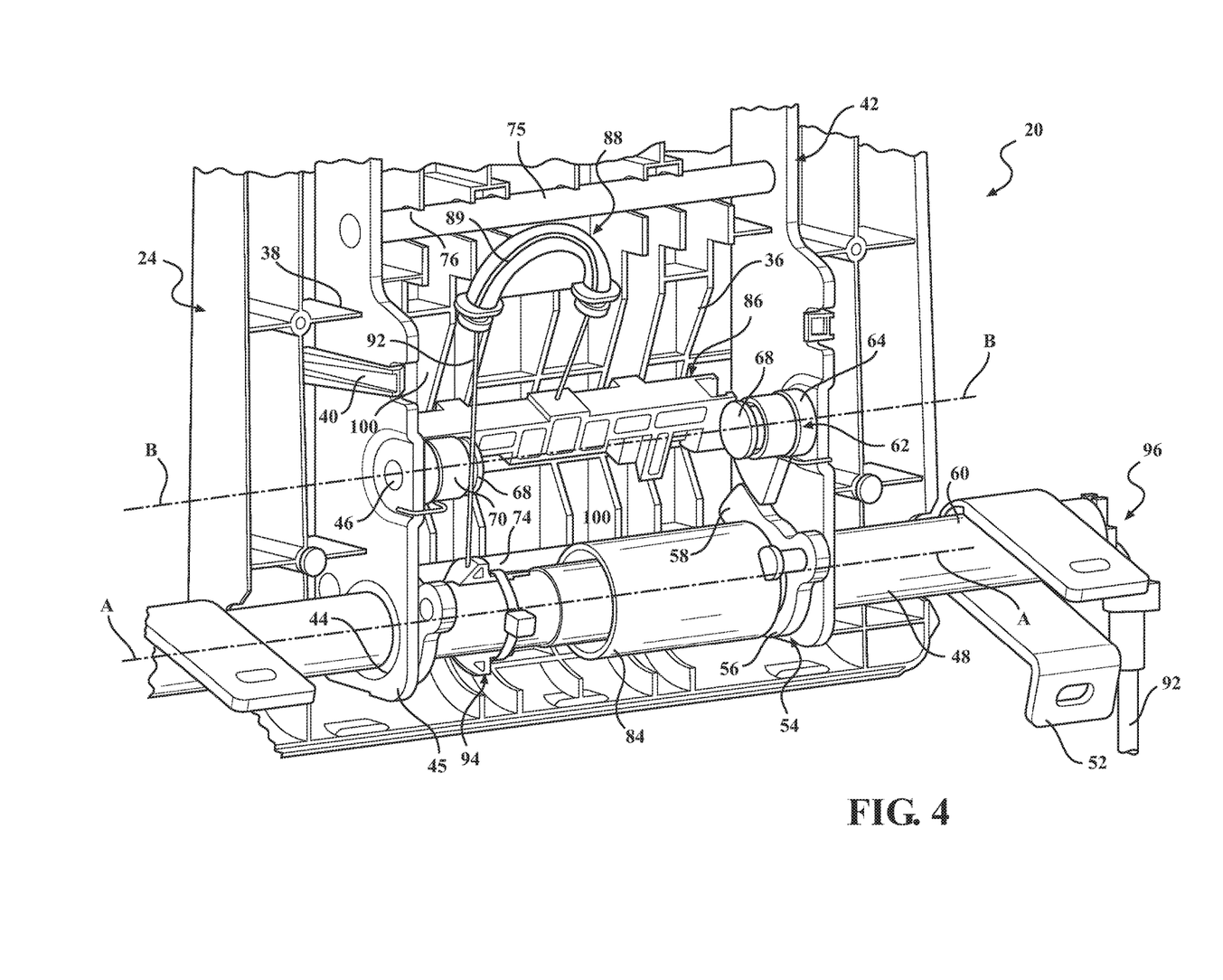
FIG. 4 is a magnified view of FIG. 3 illustrating the interface between the release connector, pivot tube, cams and latches.
Figure 5:
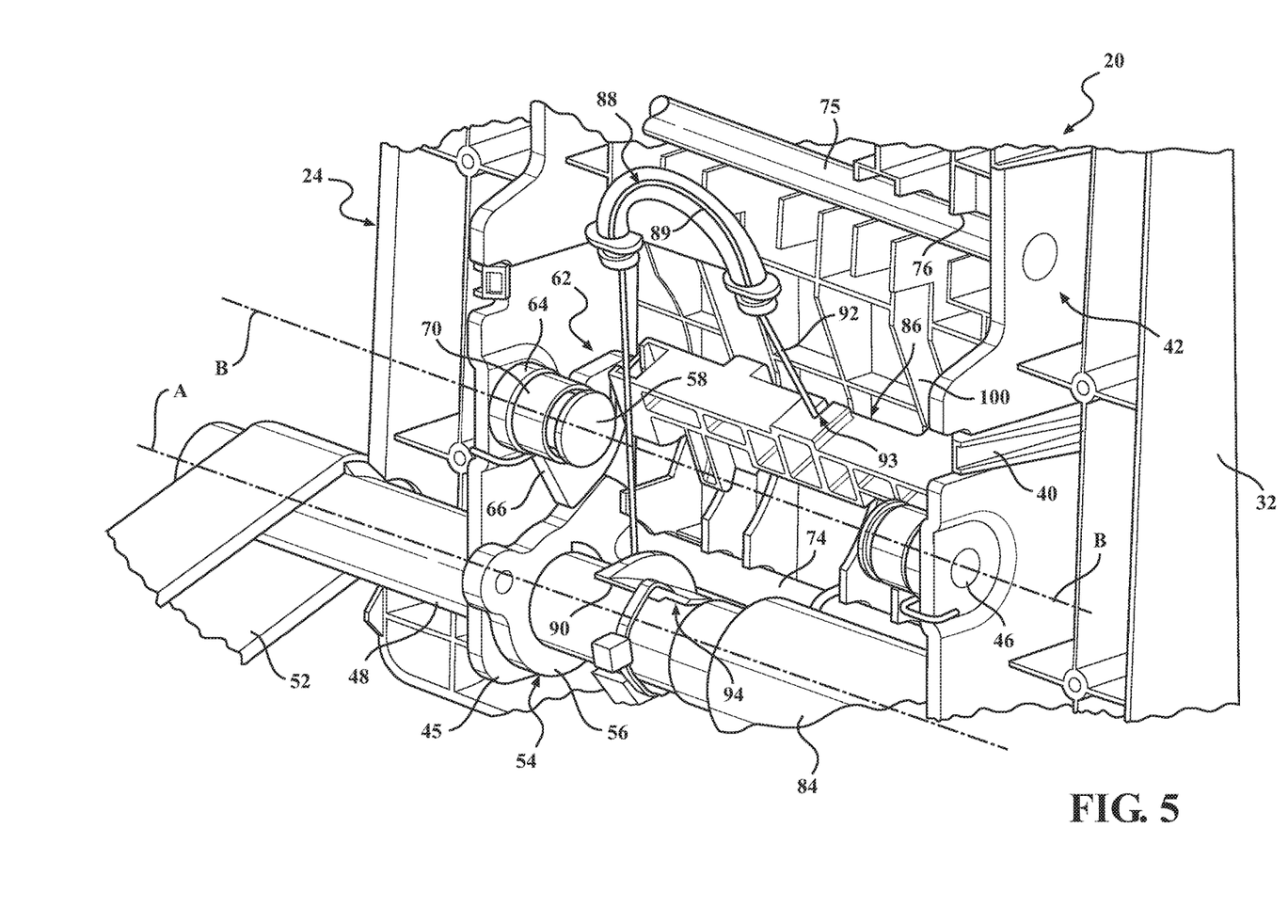
FIG. 5 is a magnified view of the foldable head restraint apparatus of FIG. 1 with the front cover removed to illustrate the interface between the release connector, pivot tube, cams and latches.

As best shown in FIGS. 4 and 5, a latch 54 is non-rotatably disposed about the pivot tube 48 adjacent to each of the brackets 42. Each of the latches 54 includes a generally circular-shaped base 56 and a projection 58 that extends radially outwardly from the base 56. One of the latches 54 includes a spring seat 60 that extends from the base 56 parallel to the first axis A.

A cam 62 is disposed against each of the brackets 42. The cam 62 has a first portion 64 that is disposed along the second axis B and an extension 66 that extends radially away from the first portion 64. The cams 62 are rotatable between a latched position and an unlatched position. The cams 62 engage the latches 54 in the latched position to fix the brackets 42 relative to the pivot tube 48 and wherein the cams 62 are spaced from the latches 54 in the unlatched position to allow the brackets 42 to be rotated about the first axis A relative to the pivot tube 48, thus allowing the head restraint apparatus 20 to be rotated into a folded position from an upright position.

A fastener 68 extends through each of the first portions 64 of the cams 62 and through the cam hole 46 of each of the brackets 42 along the second axis B for rotatably connecting the cam 62 to the bracket 42 for rotating the cam 62 about the first fastener 68 and second axis B. A first torsional spring 70 is disposed about each of the fasteners 68. The first torsional spring 70 biases the extension 66 of each of the cams 62 against the projection 58 of each of the latches 54 in the latched position to prevent rotating movement of the apparatus 20 about the first axis A.

It should be appreciated that the dual latch 54 and cam 62 configuration of the present disclosure provides a head restraint apparatus 20 which can sustain higher loads than the traditional single latch 54 head restraint systems This is because any load applied to the apparatus 20 is reacted by a multitude of latches 54 and cams 62 instead of only one of each latch 54 and cam 62.

A second torsional spring 84 is disposed about the pivot tube 48 and engages the spring seat 60 of the latch 54 and the lower spacer pin 74 for biasing the apparatus 20 in the folded position to allow the apparatus 20 to rotate about the first axis A into the folded position from the upright position upon movement of the cams 62 into the unlatched position.

As shown in FIGS. 4, 5 and 8-10, at least one release connector 86, 186, 286 is connected to the extension 66 of each of the cams 62 and is moveable for pivoting the cams 62 about the second axis B in response to movement of the release connector 86 to rotate the cams 62 between the latched and unlatched positions to allow the apparatus 20 to be pivoted about the first axis A between the upright and folded positions. Release connector 186, 286, shown in FIGS. 9 and 10, respectively, are alternate embodiments of the release connector 86.

A common problem encountered with dual cam 62 and latch 54 systems is that one cam 62 may disengage before the other cam 62 because the cams 62 may act independently from one another. Unequally timed disengagement may result in higher release efforts to fold the apparatus 20. The release connector 86 of the subject invention advantageously keeps both cams 62 synchronized in order to synchronize their disengagement from the latches 54.

A pulley 88 is disposed in spaced relationship with the release connector 86 adjacent to the middle spacer pin 75. The pivot tube 48 defines an opening 90 disposed between the brackets 42. A cable 92 extends through the hollow of the pivot tube 48 at one of the ends 50 and out of the opening 90 of the pivot tube 48 and about the pulley 88 and is connected to the release connector 86 at a connecting end 93 for moving the release connector 86 in response to pulling on the cable 92 to move the cams 62 to the unlatched position. As shown, the pulley 88 guides the cable 92 a predefined amount of degrees along an arc shaped pathway 89.

Figure 7:
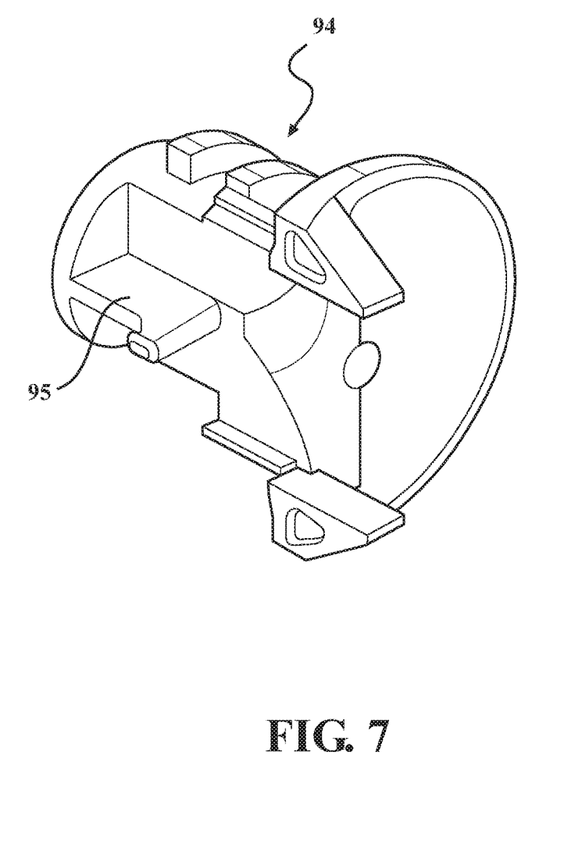
FIG. 7 is a perspective view of a conduit fitting for redirecting a cable.

As shown in FIGS. 5 and 7, a first conduit fitting 94 is disposed in the opening 90 of the pivot tube 48. The first conduit fitting 94 defines a first channel 95 that turns ninety degrees in an arc shape and receives the cable 92 from inside the pivot tube 48 to redirect the cable 92 from extending along the first axis A in the pivot tube 48 toward the pulley 88. Similarly, as best shown in FIG. 4, a second conduit fitting 96 is received in one of the ends 50 of the pivot tube 48 and defines a second channel that also turns ninety degrees in an arc shape and receives the cable 92 from outside of the pivot tube 48 into the pivot tube 48 for redirecting the cable 92 from extending perpendicularly to the first axis A to a position in which it extends along the first axis A.

It should be appreciated that the conduit fittings 94, 96 could provide direction altering service for cable 92 at other angles. It should also be appreciated that the conduit fittings 94, 96 advantageously prevent the cable 92 disposed therein from binding on the pivot tube 48, fraying, changing the cable connection length, and possibly getting stuck. More specifically, without the conduit fittings 94, 96, the cable 92 could otherwise get stuck at various points along the cable 92 on features of the pivot tube 48 during folding or unfolding of the head restraint apparatus 20.

Figure 8:
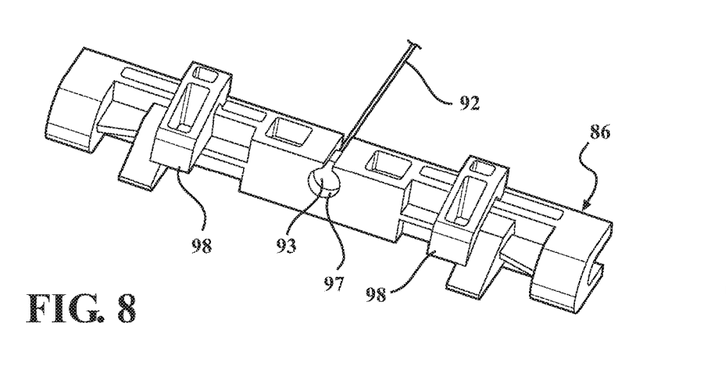
FIG. 8 is a perspective view of a first example embodiment of a release connector.

In a first example embodiment of the release connector 86, shown in FIG. 8, the release connector 86 extends linearly between the extensions 66 of the cams 62 and parallel to the first axis A and defines a center point 97 between the cams 62. The connecting end 93 of the cable 92 is connected to the center point 97. The release connector 86 further includes a pair of guide tabs 98 that extend outwardly from the release connector 86 and perpendicular to the first axis A. The guide tabs 98 extend in space and parallel relationship with one another. As best shown in FIG. 4, the ribs 36 of the rear shell 24 further define a pair of tracks 100 that each extend parallel and adjacent to one of the slots 38 for receiving the guide tabs 98 release connector 86 and allowing the release connector 86 to slide along the tracks 100. The tracks 100 assist in providing synchronized movement of the release connector 86 and cams 62.

Figure 9:
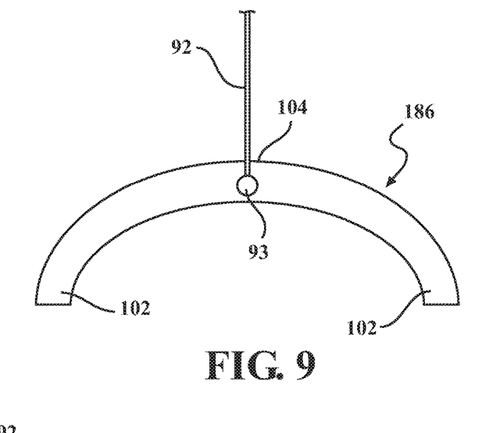
FIG. 9 is front view of a second example embodiment of a release connector.

In a second example embodiment of the release connector 186, shown in FIG. 9, the release connector 186 is generally C-shaped and extends between a pair of terminal portions 102, with each of the terminal portions 102 engaging one of the extensions 66 of the cams 62 in the same manner as release connector 86. The release connector 186 further defines a crest 104 half-way between the terminal portions 102. The connecting end 93 of the cable 92 is connected to the release connector 186 at the crest 104. It should be appreciated that this embodiment of the release connector 186 inherently stabilizes to a nominal design position due to balancing the load on the release connector 186.

Figure 10:
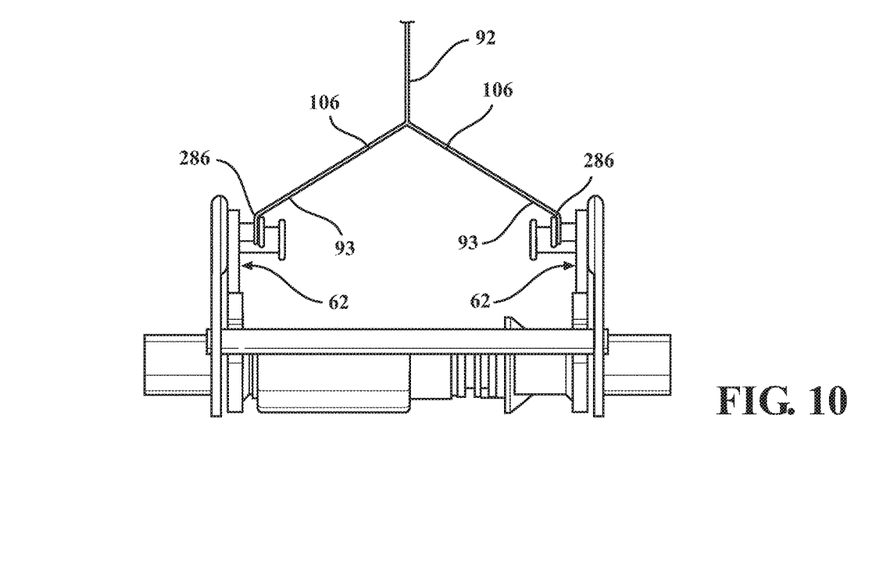
FIG. 10 is a front view a third example embodiment of a release connector.

In a third example embodiment of the release connector 286, shown in FIG. 10, a pair of release connectors 286 are provided that each extend toward one another from the extension 66 of the cam 62. Furthermore, the connecting end 93 of the cable 92 is defined by a pair of segments 106. Each of the segments 106 of the cable 92 engage one of the release connectors 286. The segments 106 inherently stabilize to a nominal design position due to balancing the load between the cams 62 on the segments 106.

The cable 92 also includes an adjustment end for being connected to a strap of an adjustment mechanism of the seat of the vehicle (not shown). It should be appreciated that mechanical action of pulling on the strap folds down the apparatus 20 by way of releasing the cams 62 from the latches 54. The vehicle seat is configured such that the initial length of pull on the strap folds the apparatus 20 and the remainder length of pull of the strap folds the seat frame.

Of course, many modifications and variations of the present invention are possible in light of the above teachings and may be practiced otherwise than as specifically described while within the scope of the appended claims.

What is claimed is:

1. A foldable head restraint apparatus for connecting to a seat of a vehicle comprising:
   a pair of brackets for being connected to a cover;
   a pivot tube rotatably supporting said brackets along a first axis;
   at least one seat connector fixedly connected to said pivot tube for non-rotatably supporting said pivot tube relative to the seat of the vehicle;
   a pair of latches each non-rotatably disposed about said pivot tube adjacent to each of said brackets;
   a pair of cams each rotatably connected to one of said brackets and rotatable between a latched position and unlatched position wherein each of said cams engage one of said latches in said latched position to fix said brackets relative to said pivot tube and wherein said cams are spaced from said latches in said unlatched position to allow said brackets to be rotated about said first axis relative to said pivot tube;
   at least one release connector connected to each of said cams and moveable for providing said rotating movement of said cams in response to movement of said release connector to provide synchronized rotation of said cams; and
   a cable connected to said release connector for providing said movement of said release connector in response to movement of said cable by an operator.

2. A foldable head restraint apparatus as set forth in claim 1 wherein said at least one release connector extends linearly between said cams and defines a center point between said cams, said cable is connected to said center point, and a pair of guide tabs extend outwardly from said release connector for being received by a pair of tracks defined by the cover for guiding said release connector during said movement of said release connector.

3. A foldable head restraint apparatus as set forth in claim 1 wherein said at least one release connector has a generally C-shape and extends between a pair of terminal portions with each of said terminal portions engaging one of said extensions of said cams, said release connector defines a crest between said terminal portions, and said cable is connected to said release connector at said crest.

4. A foldable head restraint apparatus as set forth in claim 1 wherein said at least one release connector includes a pair of release connectors each extending toward one another from one of said cams, and said cable splits into a pair of segments with each of said segments engaging one of said release connectors.

5. A foldable head restraint apparatus as set forth in claim 1 wherein said cable extends through said pivot tube, at least one conduit fitting is received said pivot tube, said conduit fitting defines a channel extending out of said pivot tube in an arc shape for receiving said cable and redirecting said cable away from said pivot tube.

6. A foldable head restraint apparatus for connecting to a seat of a vehicle comprising:
   a cover having a front shell and a rear shell connected to one another and defining a cavity therebetween;
   said front shell and said rear shell each presenting an inner face;
   an array of ribs extending transversely to said inner face of each of said shells;
   a pair of brackets connected to said rear cover in said cavity;
   at least one spacer pin extending between and connecting said brackets together;
   a plurality of said ribs of said rear cover defining a plurality of indentations for receiving said at least one spacer pin;
   said indentations each including a pair of side walls extending perpendicularly to said inner face and a bottom wall being perpendicular to said side walls; and
   said bottom wall of each of said indentations defining extrusion having a V-shape for allowing said ribs to be compressed downwardly at said bottom wall during insertion of said at least one spacer pin to secure said at least one spacer pin in place.

7. A foldable head restraint apparatus for connecting to a seat of a vehicle comprising:
   a pair of brackets for being connected to a cover;
   a pivot tube rotatably supporting said brackets along a first axis;
   at least one seat connector fixedly connected to said pivot tube for non-rotatably supporting said pivot tube relative to the seat of the vehicle;
   a pair of latches each non-rotatably disposed about said pivot tube adjacent to each of said brackets;
   a pair of cams each rotatably connected to one of said brackets and rotatable between a latched position and unlatched position wherein each of said cams engage one of said latches in said latched position to fix said brackets relative to said pivot tube and wherein said cams are spaced from said latches in said unlatched position to allow said brackets to be rotated about said first axis relative to said pivot tube;
   at least one release connector connected to each of said cams and moveable for providing said rotating movement of said cams in response to movement of said release connector to provide synchronized rotation of said cams; and
   a cable connected to said release connector for providing said movement of said release connector in response to movement of said cable by an operator; and
   wherein said at least one release connector extends linearly between said cams and defines a center point between said cams, said cable is connected to said center point, and a pair of guide tabs extend outwardly from said release connecter for being received by a pair of tracks defined by the cover for guiding said release connector during said movement of said release connector.

8. A foldable head restraint apparatus as set forth in claim 7 wherein said at least one release connector has a generally C-shape and extends between a pair of terminal portions with each of said terminal portions engaging one of said extensions of said cams, said release connector defines a crest between said terminal portions, and said cable is connected to said release connector at said crest.

9. A foldable head restraint apparatus as set forth in claim 7 wherein said at least one release connector includes a pair of release connectors each extending toward one another from one of said cams, and said cable splits into a pair of segments with each of said segments engaging one of said release connectors.

10. A foldable head restraint apparatus as set forth in claim 7 wherein said cable extends through said pivot tube, at least one conduit fitting is received said pivot tube, said conduit fitting defines a channel extending out of said pivot tube in an arc shape for receiving said cable and redirecting said cable away from said pivot tube.

11. A foldable head restraint apparatus for connecting to a seat of a vehicle comprising:
   a pair of brackets for being connected to a cover;
   a pivot tube rotatably supporting said brackets along a first axis;
   at least one seat connector fixedly connected to said pivot tube for non-rotatably supporting said pivot tube relative to the seat of the vehicle;
   a pair of latches each non-rotatably disposed about said pivot tube adjacent to each of said brackets;
   a pair of cams each rotatably connected to one of said brackets and rotatable between a latched position and unlatched position wherein each of said cams engage one of said latches in said latched position to fix said brackets relative to said pivot tube and wherein said cams are spaced from said latches in said unlatched position to allow said brackets to be rotated about said first axis relative to said pivot tube;
   at least one release connector connected to each of said cams and moveable for providing said rotating movement of said cams in response to movement of said release connector to provide synchronized rotation of said cams; and
   a cable connected to said release connector for providing said movement of said release connector in response to movement of said cable by an operator; and
   wherein said at least one release connector has a generally C-shape and extends between a pair of terminal portions with each of said terminal portions engaging one of said extensions of said cams, said release connector defines a crest between said terminal portions, and said cable is connected to said release connector at said crest.

12. A foldable head restraint apparatus as set forth in claim 11 wherein said at least one release connector extends linearly between said cams and defines a center point between said cams, said cable is connected to said center point, and a pair of guide tabs extend outwardly from said release connector for being received by a pair of tracks defined by the cover for guiding said release connector during said movement of said release connector.

13. A foldable head restraint apparatus as set forth in claim 11 wherein said at least one release connector includes a pair of release connectors each extending toward one another from one of said cams, and said cable splits into a pair of segments with each of said segments engaging one of said release connectors.

14. A foldable head restraint apparatus as set forth in claim 11 wherein said cable extends through said pivot tube, at least one conduit fitting is received said pivot tube, said conduit fitting defines a channel extending out of said pivot tube in an arc shape for receiving said cable and redirecting said cable away from said pivot tube.

15. A foldable head restraint apparatus for connecting to a seat of a vehicle comprising:
   a pair of brackets for being connected to a cover;
   a pivot tube rotatably supporting said brackets along a first axis;
   at least one seat connector fixedly connected to said pivot tube for non-rotatably supporting said pivot tube relative to the seat of the vehicle;
   a pair of latches each non-rotatably disposed about said pivot tube adjacent to each of said brackets;
   a pair of cams each rotatably connected to one of said brackets and rotatable between a latched position and unlatched position wherein each of said cams engage one of said latches in said latched position to fix said brackets relative to said pivot tube and wherein said cams are spaced from said latches in said unlatched position to allow said brackets to be rotated about said first axis relative to said pivot tube;
   at least one release connector connected to each of said cams and moveable for providing said rotating movement of said cams in response to movement of said release connector to provide synchronized rotation of said cams; and
   a cable connected to said release connector for providing said movement of said release connector in response to movement of said cable by an operator; and
   wherein said at least one release connector includes a pair of release connectors each extending toward one another from one of said cams, and said cable splits into a pair of segments with each of said segments engaging one of said release connectors.

16. A foldable head restraint apparatus as set forth in claim 15 wherein said at least one release connector extends linearly between said cams and defines a center point between said cams, said cable is connected to said center point, and a pair of guide tabs extend outwardly from said release connecter for being received by a pair of tracks defined by the cover for guiding said release connector during said movement of said release connector.

17. A foldable head restraint apparatus as set forth in claim 15 wherein said at least one release connector has a generally C-shape and extends between a pair of terminal portions with each of said terminal portions engaging one of said extensions of said cams, said release connector defines a crest between said terminal portions, and said cable is connected to said release connector at said crest.

18. A foldable head restraint apparatus as set forth in claim 15 wherein said cable extends through said pivot tube, at least one conduit fitting is received said pivot tube, said conduit fitting defines a channel extending out of said pivot tube in an arc shape for receiving said cable and redirecting said cable away from said pivot tube.

19. A foldable head restraint apparatus for connecting to a seat of a vehicle comprising:
   a pair of brackets for being connected to a cover;
   a pivot tube rotatably supporting said brackets along a first axis;
   at least one seat connector fixedly connected to said pivot tube for non-rotatably supporting said pivot tube relative to the seat of the vehicle;
   a pair of latches each non-rotatably disposed about said pivot tube adjacent to each of said brackets;
   a pair of cams each rotatably connected to one of said brackets and rotatable between a latched position and unlatched position wherein each of said cams engage one of said latches in said latched position to fix said brackets relative to said pivot tube and wherein said cams are spaced from said latches in said unlatched position to allow said brackets to be rotated about said first axis relative to said pivot tube;
   at least one release connector connected to each of said cams and moveable for providing said rotating movement of said cams in response to movement of said release connector to provide synchronized rotation of said cams; and
   a cable connected to said release connector for providing said movement of said release connector in response to movement of said cable by an operator; and
   wherein said cable extends through said pivot tube, at least one conduit fitting is received said pivot tube, said conduit fitting defines a channel extending out of said pivot tube in an arc shape for receiving said cable and redirecting said cable away from said pivot tube.

20. A foldable head restraint apparatus as set forth in claim 19 wherein said at least one release connector extends linearly between said cams and defines a center point between said cams, said cable is connected to said center point, and a pair of guide tabs extend outwardly from said release connector for being received by a pair of tracks defined by the cover for guiding said release connector during said movement of said release connector.

21. A foldable head restraint apparatus as set forth in claim 19 wherein said at least one release connector has a generally C-shape and extends between a pair of terminal portions with each of said terminal portions engaging one of said extensions of said cams, said release connector defines a crest between said terminal portions, and said cable is connected to said release connector at said crest.

22. A foldable head restraint apparatus as set forth in claim 19 wherein said at least one release connector includes a pair of release connectors each extending toward one another from one of said cams, and said cable splits into a pair of segments with each of said segments engaging one of said release connectors.

* * * * *